United States Patent [19]
Richards

[11] Patent Number: 5,092,547
[45] Date of Patent: Mar. 3, 1992

[54] PIPE HANGER WITH SHOCK LOAD ABSORBING SUPPORT LEG

[75] Inventor: Peter S. Richards, Issaquah, Wash.

[73] Assignee: Progressive Fastening, Inc., Seattle, Wash.

[21] Appl. No.: 368,072

[22] Filed: Jun. 15, 1989

Related U.S. Application Data

[63] Continuation of Ser. No. 202,128, Jun. 2, 1988, abandoned, which is a continuation of Ser. No. 927,437, Nov. 6, 1986, abandoned, which is a continuation-in-part of Ser. No. 730,285, May 3, 1985, abandoned.

[51] Int. Cl.⁵ .............................................. F16L 3/08
[52] U.S. Cl. ..................................... 248/62; 248/74.1

[56] References Cited

U.S. PATENT DOCUMENTS

| | | | |
|---|---|---|---|
| 628,297 | 7/1899 | Barr | 411/166 |
| 1,329,268 | 1/1920 | Dickelmann et al. | 248/71 X |
| 2,319,109 | 5/1943 | Bullock | 248/295.1 X |
| 2,846,169 | 8/1958 | Sullivan | 248/62 |
| 3,404,858 | 10/1968 | Levy | 248/74.1 |
| 3,517,901 | 6/1970 | Jenkins | 248/59 |
| 3,528,634 | 9/1970 | Jenkins | 248/70 |
| 4,267,994 | 5/1981 | Cynch et al. | 248/74.1 X |
| 4,735,386 | 4/1988 | Richards | 248/74.1 |

FOREIGN PATENT DOCUMENTS

| | | | |
|---|---|---|---|
| 689500 | 6/1964 | Canada | 248/74.1 |
| 45706 | 6/1957 | Italy | 248/74.1 |
| 963599 | 7/1964 | United Kingdom | 248/74.4 |

Primary Examiner—Alvin C. Chin-Shue
Attorney, Agent, or Firm—Delbert J. Barnard

[57] ABSTRACT

A bolt (54) is inserted threaded end (60) first through a first opening (50) within an arm portion (14) of a C-shaped saddle (12) then through a larger opening (52) in the second arm portion (16) of the saddle (12). The opening (52) is hexagonal in shape. A nut (62) is then installed on the bolt (54). The nut (62) has a small end portion (64) which is hexagonal in shape. The nut (62) is hand tightened and then is aligned with the opening (52) so that the small end portion (64) will be aligned with the opening (52). A wrench is then used on the head (58) of the bolt (54) for rotating the bolt (54) for the purpose of drawing the nut (62) and bolt (54) together and applying a clamping force on a pipe (22) which is in the saddle (12). The saddle (12) is connected to a support leg (24) constructed from two bars (26, 28) which are welded together and to the saddle (12) at their outer ends. The bars (26, 28) are spread apart and at there inner ends (38, 40) are welded to a support structure (42). Thus forms a triangular truss (48) which is rigid. The welded together outer end portions of the bars (26, 28) form a beam section (34) which is in effect a cantilever beam secured at its inner end to the truss (48). This beam section (34) bends in response to shock loads applied on the pipe hanger.

5 Claims, 3 Drawing Sheets

PIPE HANGER WITH SHOCK LOAD ABSORBING SUPPORT LEG

This application is a continuation of application Ser. No. 07/202,128, filed June 2, 1988, abandoned, which is a continuation of Ser. No. 06/927,437, filed Nov. 6, 1986, abandoned, which is a continuation-in-part of Ser. No. 06/730,285 filed May 3, 1985, abandoned.

TECHNICAL FIELD

This invention relates to pipe hangers. More particularly, it relates to the provision of a pipe hanger capable of absorbing severe shock loads.

BACKGROUND ART

The present invention relates to an improvement of the general type of pipe hanger that is disclosed by U.S. Pat. No. 3,517,901, granted July 30, 1970, to John C. Jenkins, known as a side-load type hanger.

As an inspection of U.S. Pat. No. 3,517,901 will show, the side-load type hanger is characterized by a generally C-shaped saddle in which a pipe section is received. The saddle is welded to one end of a support leg. The support leg is at its other end connected to a support structure. The pipe section, surrounded by a liner, is positioned within the interior of the saddle. In accordance with the teachings of U.S. Pat. No. 3,517,901, a key is inserted through aligned slot-type openings in arm portions of the saddle. The key has a head at its lower end which abuts against the lower arm portion of the saddle. When the key is in place, an installation tool is used to curl the opposite end portion of the key over the end of the upper end portion of saddle.

The use of a key closure for the saddle has produced several problems. Firstly, when the end of the key is bent over the end of the upper arm of the saddle, the weld connection between the saddle and the support leg is stressed and often tore. It is difficult to regulate the clamping force on the pipe, so quite often the clamping force is not tight enough. It is difficult to correct this situation by again grasping the end of the key and curling an additional amount for tightening the grip on the pipe.

Another known form of pipe hanger comprises two pipe engaging members. The central portion of one of the members is secured to an end of the support leg to form a "T". This member is configured to fit down on top of a section of pipe. The second member extends below this section of pipe. A bolt is provided on each side of the pipe. The bolts extend through end portions of the clamp members and thread into the nuts. The bolts are screwed onto the nuts for the purpose of securing the two clamp members together and for regulating the clamping force on the pipe. A system of this type is illustrated in my aforementioned application Ser. No. 730,285.

The above two-bolt type system was in use long before the system disclosed by U.S. Pat. No. 3,517,901. The system disclosed by U.S. Pat. No. 3,517,901 was considered to be an economic improvement over the two-bolt system because it required installation of but a single closure member and a single tool. The "T" support required the use of two bolts. Another objection to this type of nut and bolt system is that there is sometimes improper alignment between the holes of the two members and this creates an assembly problem.

A primary object of the present invention is to provide a side-load type pipe hanger which includes a nut and bolt assembly for closing the open side of the saddle, and which involves an arrangement which allows the bolt to be quickly installed and quickly secured in place by use of a single wrench.

A second primary object of the present invention is to provide a pipe hanger which includes a saddle, and a support leg for the saddle which is constructed to withstand substantial shock loads.

Hanger systems known in the patent literature are disclosed by the following U.S. Pat. Nos. 1,031,851, granted July 9, 1912, to H. C. January; 1,579,418, granted Apr. 6, 1926, to C. C. Tomkinson; 1,619,768, granted Mar. 1, 1927, to Friedrich W. Schubert; 1,850,275, granted Mar. 22, 1932, to Luther R. Zifferer; 2,762,592, granted Sept. 11, 1956, to Charles Adams, Jr.; 2,762,598, granted Sept. 11, 1956, to Richard M. Runge; 2,846,169, granted Aug. 5, 1958, to J. J. Sullivan; 2,936,992, granted May 17, 1960, to George J. Picha et al.; 3,034,753, granted May 15, 1962, to Frank C. Johnston et al.; 3,265,340, granted Aug. 9, 1966, to James W. Attwood; 3,273,838, granted Sept. 20, 1966, to Walter H. Fletcher et al.; 3,506,227, granted Apr. 14, 1970, to John C. Jenkins; 3,517,901, granted June 30, 1970, to J. C. Jenkins; 4,305,557, granted Dec. 15, 1981, to Joseph W. Kowalski; 4,461,440, granted July 24, 1984, to Richard W. Heath; Holland Pat. No. 13267, published in 1925; British Pat. No. 488,960, granted July 18, 1938; and Swedish Pat. No. 152,388, granted Nov. 15, 1955. These patents should be carefully considered for the purpose of putting the present invention into proper perspective relative to the prior art.

The disclosed subject matter of my co-pending application Ser. No. 730,285 is prior art with respect to this application for the reason that such subject matter was put on sale in the summer of 1985.

DISCLOSURE OF THE INVENTION

The pipe hanger of the present invention is basically characterized by a generally C-shaped saddle comprising a pair of spaced apart arm portions and an interconnecting bight portion, together defining a space in which a pipe is received. A means is connectable to the saddle to extend from one arm portion to the other, outwardly the pipe, for retaining the pipe within the saddle. A support leg means connects the saddle to the support structure. The support leg means comprises a pair of elongated metal bars each being substantially thinner than it is wide. The bars have saddle end portions and opposite mounting end portions. At their saddle ends the bars are welded together and to an arm portion of the saddle. The welded together portions form a relatively stiff stem projecting substantially perpendicular to the arm portion of the saddle. In accordance with an aspect of the invention, the pipe hanger is delivered to a customer with the two bars together, i.e. in juxtaposition. The customer pulls the two bars apart, where they are not connected, so that each extends at an angle to the other. Then the inner ends of the bars are secured to a support structure. The two bars are welded together at their outer ends a sufficient distance to produce a stem that will behave as a cantilever beam of sufficient flexibility to absorb shock loads.

The system of the invention for securing a pipe section in place is basically characterized by a bolt having a rod body, an enlarged head at a first end of the rod body and a threaded end portion at the second end of the rod body. It also comprises a nut which includes a central opening that includes threads which complement the threads of the bolt. The nut has a small size first end portion which has a cross-sectional shape that is other than circular, a large size second end portion, and a shoulder where the two ends meet. One of the arm portions of the saddle includes a first opening which is smaller in size than the head of the bolt but is larger in size than the rod body of the bolt. In other words, the rod body of the bolt makes a loose fit in the first opening. The second arm portion includes a second opening which is substantially larger in size than the rod body of the bolt. This allows the rod body to also fit loosely in the second opening. The second opening is smaller in size than the second end portion of the nut but is sized and complementarily shaped to snugly receive the small size first end portion of the nut.

Owing to this arrangement, a pipe section can be placed into the C-shaped saddle. Then, a workman can quickly insert the bolt into place. The threaded end portion is moved easily and quickly through the first opening, because of the loose fit. It is then also moved easily and quickly through the second opening, also because of its loose fit in the second opening. Then the nut is brought to the bolt, with its small size first end portion directed towards the second opening. The nut is partially screwed onto the bolt by hand. Then, the bolt and nut are moved snugly within the second opening. The noncircular cross section of the small end of the nut and the second opening prevents relative rotation of the nut in the second opening. Thus, the boundaries of the second opening in effect function as a wrench for holding the nut against rotation. Then, a single wrench is placed on the head of the bolt and is rotated for the purpose of drawing the nut and bolt together, for applying a clamping force on the pipe section. This force can easily be adjusted by regulating the amount that the bolt is tightened. Later adjustments can be easily made. The nut and bolt can be easily disassembled if desired and can then be reassembled and tightened again to provide the desired amount of clamping force on the pipe section.

In preferred form, the saddle is connected to the stem of the support leg means, with the general orientation being like the support leg to saddle arrangement disclosed by the aforementioned U.S. Pat. No. 3,517,901. The first opening is provided in the free arm portion of the saddle and the second opening is provided in the arm portion of the saddle which is connected to the stem. Thus, the bolt is inserted first through the first opening then through the second opening. It is never necessary to use a wrench in the region of the second opening. In many installations the room in this region is very limited and the use of a wrench in this region could be very difficult or even impossible.

In this preferred arrangement, the threaded end of the bolt is moved through an oversized first opening, so that the bolt can be moved through the opening quite quickly. The oversized nature of this opening makes it quite easy to move the bolt through the first opening. The second opening is even larger in size because it is sized to receive the external dimensions of the small end of the nut. Thus, precise alignment is not necessary. Next the nut is installed and started by hand. It is then quite easy to bring the small end of the nut into the second hole. When the nut is so positioned it cannot rotate. The opening functions like a box wrench and holds the nut against turning. The bolt head can then be easily and quickly rotated for drawing the nut and bolt together. When the bolt head reaches the lower arm portion of the saddle, a wrench can be used to further turn the bolt head, for tightening the bolt until the desired clamping pressure on the pipe section is obtained. The bolt is self-aligning. If the two openings are in substantial alignment when the bolt is tightened, its rod body will end up substantially centered relative to the first opening. However, another advantage of this system is that exact alignment of the two openings is not necessary.

A further advantage of the nut and bolt type fastener of the present invention, and its arrangement with the saddle, is that the relatively tight engagement of the nut within the opening in the mounted arm portion of the saddle causes the nut and bolt assembly to in a sense brace the mounted arm portion against appreciable bending as the bolt and nut are being screwed together. The oversize nature of the opening in the free arm portion allows movement to occur at this end, between the bolt and the free arm portion of the saddle. As a result, greater bending will occur in the free arm portion of the saddle and the weld connection between the mounted arm portion and the leg member will be protected from forces which would tend to tear the weld.

Another advantage of the system of the present invention is that the hanger can be made stronger and tougher than the type of hanger disclosed by U.S. Pat. No. 3,517,901, without any substantial sacrifice in economic advantage. It is an object of the present invention to develop a side-load type pipe hanger which exhibits working load capabilities more nearly equaling that of a standard "T" strap, bottom-load, pipe hanger.

It is a further object of the invention to develop a side-load type pipe hanger that features a reliable and reusable method of restraining the pipe within the hanger body, effectively replacing the sheet metal key in the system shown by U.S. Pat. No. 3,517,901.

It is a further object of the present invention to accomplish both of the above, while maintaining the relatively low cost of the side-load design, and the simplicity of the "single tool" installation feature.

The hanger system of the present invention, when compared with the hanger system disclosed by U.S. Pat. No. 3,517,901, possesses these advantages:

The hanger of the present invention can be made to be tougher and stronger because the sheet metal key has been replaced by a nut and bolt assembly. Thicker metal can be used for the saddle for the reason that the projecting end of the upper arm portion does not have to bend (in fact it is restrained against bending) to function. The hanger of the present invention is simpler to install because the self-aligning, captured nut arrangement used in the mounted arm portion of the pipe saddle allows the pipe fitter to install the pipe using just one, very common tool—a single wrench. The "prevailing-torque" locking feature of the captured nut allows the fitter to install and remove the bolt up to seven times before the nut should be replaced. The clamping force of the nut and bolt assembly is less likely to tear the weld connection between the pipe saddle and the support leg. The fit of the nut in the hole in the support arm, and the contact of the nut shoulder around the hole, stiffen the support arm against bending and in this manner protect the weld. The hanger can be shipped with the two parts of the support leg together. The design of the support leg to include a stem projecting from the triangular main part enables the hanger to absorb and withstand substantial shock loads.

These and other features, advantages and characteristics of the invention will be apparent from the various embodiments of the invention which are illustrated and described below in connection with the drawing.

BRIEF DESCRIPTION OF THE DRAWING

Like reference numerals are used to designate like parts throughout the several views of the drawing, and.

BEST MODE FOR CARRYING OUT THE INVENTION

Figure 1:
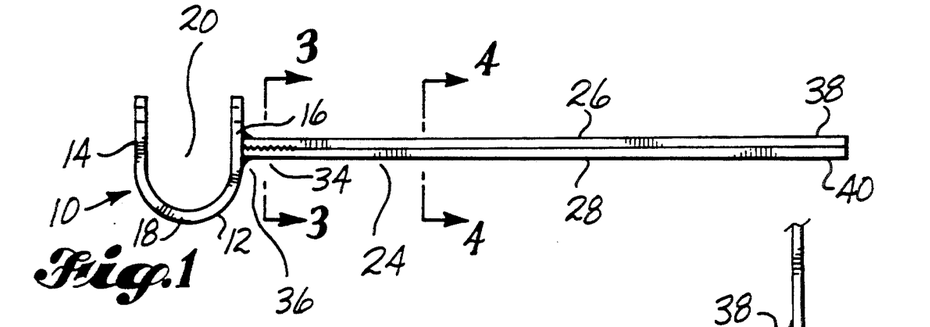
FIG. 1 is a side elevational view of a pipe hanger constructed according to the present invention, in a condition for shipment to a user, minus the liner and the nut and bolt assembly.

Referring first to FIG. 1, the pipe hanger 10 is shown to comprise a generally C-shaped saddle 12 comprising a pair of spaced apart arm portions 14, 16 and an interconnecting bite portion 18. The arm portions 14, 16 and the bite portion 18 together define a space 20 in which a section of pipe 22 is received.

Figures 2, 3:
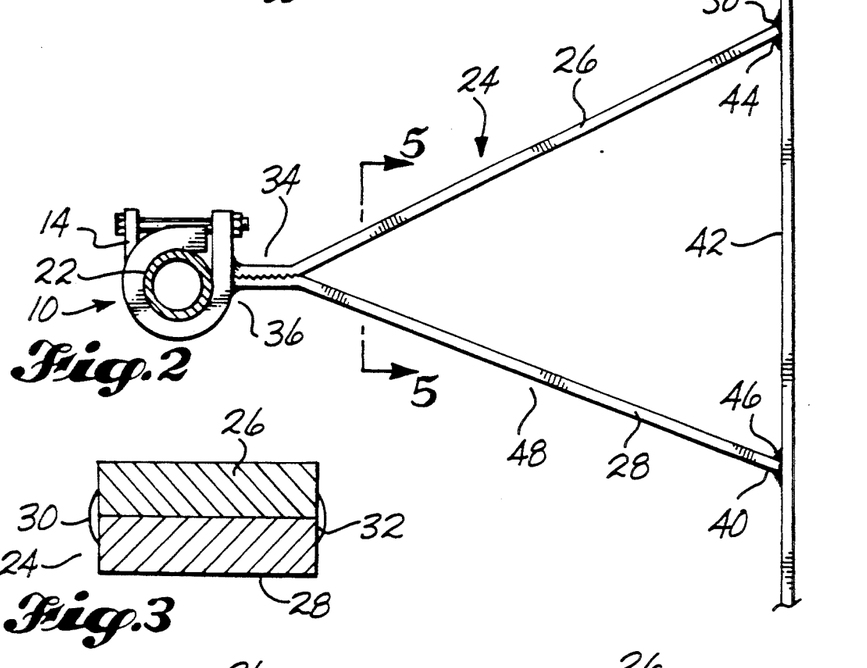
FIG. 2 is a view like FIG. 1, but showing the two parts of the support leg member spaced apart and secured at their inner ends to a support structure, and showing a pipe and a liner within the saddle and a nut and bolt assembly installed for applying a clamping pressure on the pipe.
FIG. 3 is a sectional view taken substantially along line 3—3 of FIG. 1.
Figure 4:
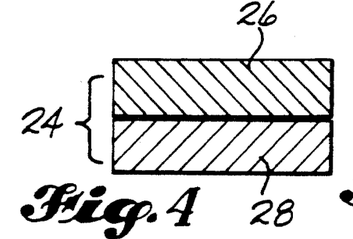
FIG. 4 is a sectional view taken substantially along line 4—4 of FIG. 1.
Figure 5:
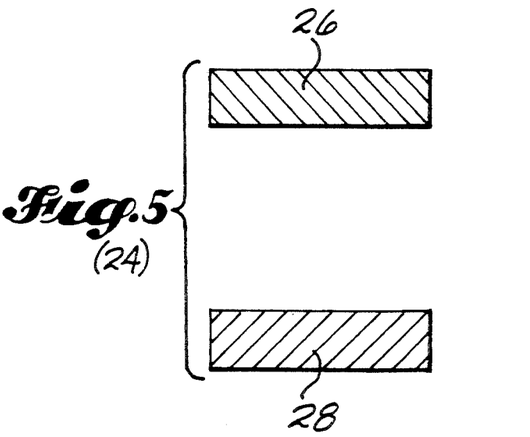
FIG. 5 is a sectional view taken substantially along line 5—5 of FIG. 2.

In accordance with the present invention, the pipe hanger includes a support leg 24 constructed from a pair of elongated metal bars 26, 28. As best shown by FIGS. 3-5, each bar 26, 28 is thinner than it is wide. Initially, the bars 26, 28 are straight. Bar 26 is situated on bar 28, with their side edges aligned, as illustrated. In other words, the bars 26, 28 are in juxtaposition.

The bars 26, 28 are welded together and to the leg portion 16 (e.g. for about two inches) of the saddle 12. They are welded together by beads of welds 30, 32 which extend from the saddle arm portion 16 for about two inches along the sides of the bars 26, 28. Of course, the exact length of the beads 30, 32 is a variable. The important consideration is that the end portions of the bars 26, 28 be welded together a distance sufficient to create a one-piece beam inwardly adjacent the saddle arm portion 16 which is long enough to flex in use, as will hereinafter be described in more detail.

The welded together portion of the bars 26, 28 is designated 34 in FIGS. 1-3 and 6-8, 10 and 11. This portion 34 is welded at its end to the saddle arm portion 16. A single bead of weld 36 may extend entirely around the perimeter of the outer end of the portion 34.

The pipe hanger is delivered to a customer with the two bars 26, 28 in juxtaposition. The customer pulls the two bars 26, 28 apart, so that each extends at an angle to the other, as illustrated by FIG. 2. Then, the inner ends 38, 40 of the bars 26, 28 are secured to a support structure 42. This may be done by welding the ends 38, 40 to the support structure 42. In FIG. 2 a weld bead 44 is shown between bar end 38 and the support 42. A weld bead 46 is shown between the bar end 40 and the support 42.

Figure 6:
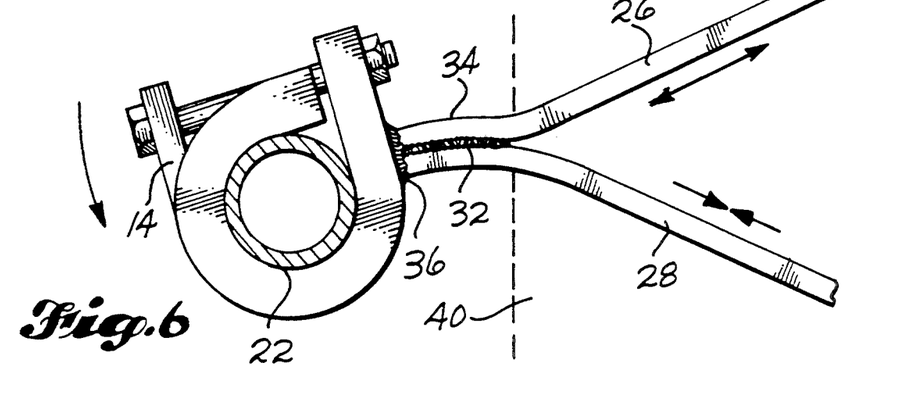
FIG. 6 is a fragmentary side elevational view showing an exagerated downward bending of the outer end portion of the hanger in response to a shock load.
Figure 7:
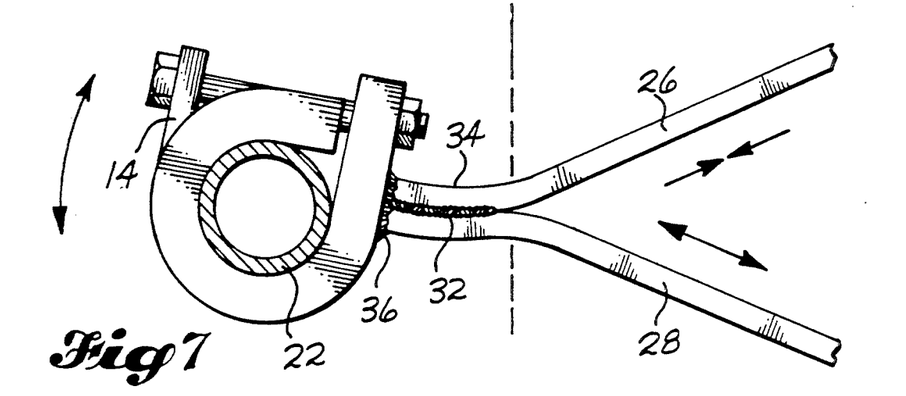
FIG. 7 is a view like FIG. 6, showing the end portion of the hanger swung upwardly in response to a shock load.

FIG. 6 and 7 illustrate the benefit obtained by welding the outer end portions of the bars 26, 28 together to form the end beam 34. The support leg means 24, when installed, in effect has two parts. The triangular shaped part, formed by the bars 26, 28 where they are spread apart from each other, functions as a rigid support for the outer end beam 34. The outer end beam 34 is in effect cantilevered out from the rigid triangular portion 48. FIGS. 6 and 7 illustrate what in effect happens. The portion 48 functions as a fixed support for the inner end of the end beam 34. The end beam 34 deflects downwardly and/or upwardly relative to the fixed portion 48, in response to shock loads. For example, support 42 may be a wall portion of a submarine. Shock loads imposed on the submarine would cause the outer end beam 34 to bend either downwardly or upwardly, like a cantilever beam.

In accordance with an aspect of the invention, a first opening 50 is provided in saddle arm portion 14. A second and larger opening 52 is provided in the saddle arm portion 16. The centers of openings 50, 52 are in substantial alignment.

A bolt 54 is inserted through the openings 50, 52. Bolt 54 includes a rod body 56, an enlarged head 58 at one end, and a threaded portion 60 at its opposite end. The bolt 54 is adapted to mate with a nut 62.

Figures 10, 11, 12, 13, 14, 15:
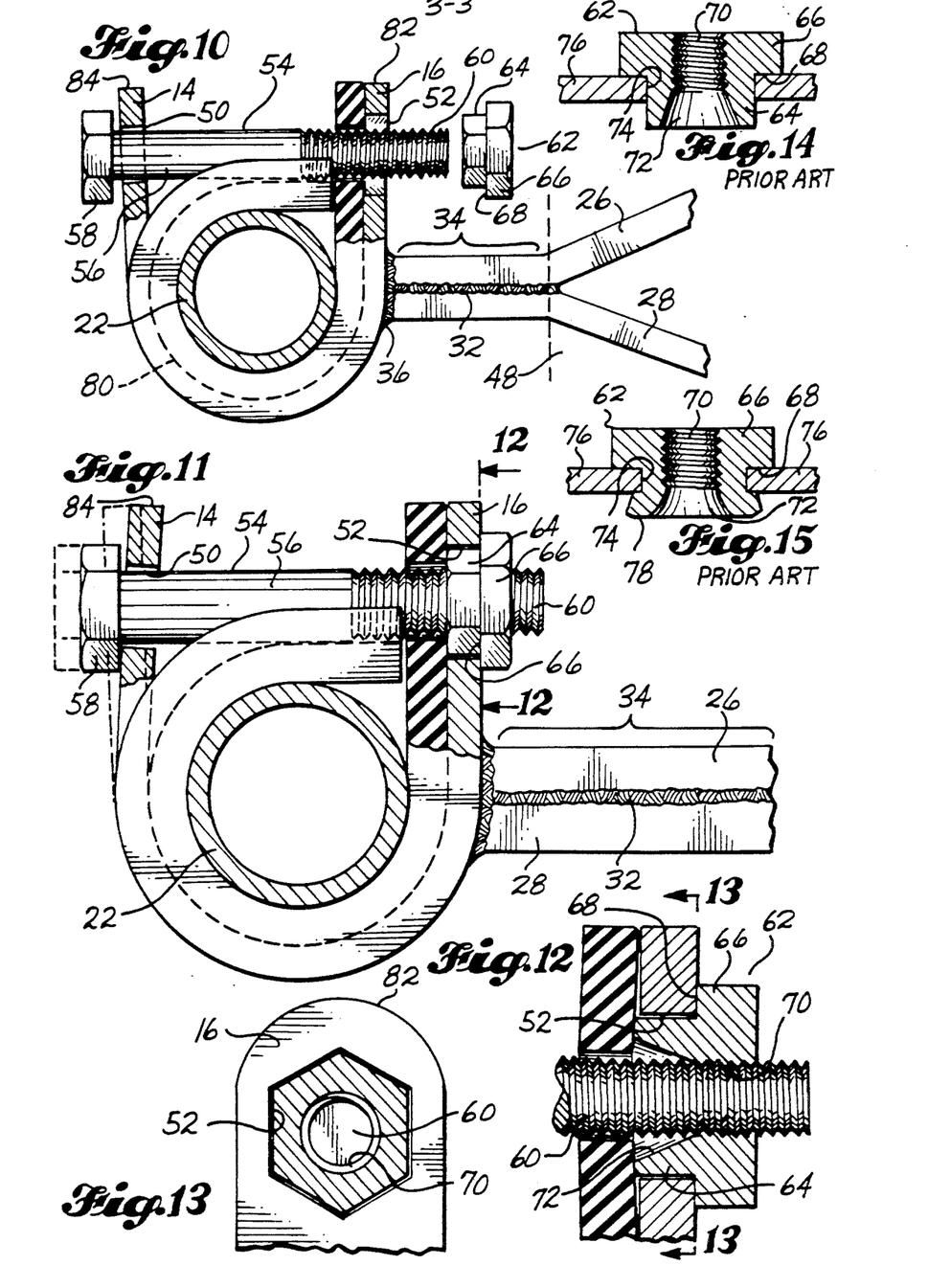
FIG. 10 is an enlarged scale, fragmentary elevational view of the outer end portion of the hanger, showing the nut in spaced alignment with a threaded portion of the bolt, prior to installation of the nut on the bolt.
FIG. 11 is a view like FIG. 10, showing the nut installed and showing how the free arm portion of the saddle is influenced to bend, and the connected arm portion of the saddle is substantially restrained against bending, by the nut and bolt assembly and its relationship to the two holes in the two arm portions of the saddle.
FIG. 12 a sectional view through an installed nut and the immediate regions surrounding it.
FIG. 13 is a sectional view taken substantially along line 13—13 of FIG. 11.
FIG. 14 is a view of a prior art nut shown inserted in a hole in a piece of sheet metal.
FIG. 15 is a view like FIG. 14, but showing the leading portion of the nut curled back onto the sheet metal, which is the normal installation mode.

As shown by FIGS. 10-13, nut 62 comprises a first small end portion 64, a second large end portion 66, and a shoulder 68 where the two end portions 64, 66 meet. Nut 62 includes a threaded central opening 70 having complimentary threads to the threads on threaded portion 60 of bolt 54. Nut 62 may also include a nonthreaded conical entry 72 (FIG. 12).

As shown by FIGS. 10-13, the large end portion 66 of nut 62 is hexagonal and the small end portion 64 is also hexagonal. Regarding the small end portion 64, it is only functionally important that this portion be noncircular in cross section and that it be sized to fit snugly within the opening 52.

The particular nut 62 that is illustrated is a known article of commerce. However, the manner in which it is used in the present invention is not known. FIGS. 14 and 15 illustrate the known use of the nut construction that is illustrated. The nut in these figures is also designated 62.

A hexagonal opening 74 is formed in a piece of sheet metal 76. Opening 74 is sized to snugly receive the small end 64 of the nut 62. The shoulder 68 rests against the sheet metal 76 where it immediately surrounds the opening 74. As shown by FIG. 14, the end portion 64 is sized to extend through and beyond the opening 74. Then, it is "rolled" back against the sheet metal 76, as shown at 78 (FIG. 15), for the purpose to in this manner secure the nut 62 to the sheet metal 76.

Referring to the description of the present invention, in accordance with the present invention the small end portion 64 of the nut 62 is sized to be snugly received within the opening 52 (FIGS. 11-13), but there is no projecting portion which is rolled back for permanently securing the nut 62 in place. Rather, the opening 52 functions as a "box" wrench for holding the end portion 64, and hence nut 62, against turning when the end portion 64 is within the opening 52 and a turning torque is applied to the bolt 54.

As is clearly shown by FIGS. 10 and 11, the opening 50 is oversized relative to the rod body 56 of bolt 54. Thus, the bolt 54 can be inserted through opening 50 rather quickly and easily. The opening 52 is substantially larger than the threaded end portion 60 of bolt 54, so it is very easy to locate end portion 60 relative to opening 52 so that the bolt 54 can be quickly inserted through opening 52.

In accordance with an aspect of the present invention, the pipe section 22, surrounded by a liner 80, is moved laterally into the open throat 20 of the saddle 12. This can be done by first placing the liner within the throat 20, and then inserting the pipe section 22 into the liner 80. Or, the liner 80 can be wrapped around the pipe section 22 and the assembly asserted in the saddle throat 20. Next, the bolt 54 is moved through the openings 50, 52, in the manner described. Then, the nut 62 is brought into engagement with the threaded end portion 60 of the bolt 54, with the small end portion 64 directed towards the bolt 54. The conical region 72 that was formed for the purpose of adapting the end portion 78 for rolling over the sheet metal edge (FIGS. 14 and 15) now serves to guide the threaded end portion 60 of the bolt 54 into the threaded region 70 of the nut 62. The nut 62 is screwed onto the threads 70, by hand, until the nut and bolt assembly 54, 62 are joined. Then, the assembly is moved endwise of the bolt 54, to place the end portion 64 of nut 60 into the opening 52. Opening 52 now functions as a box wrench, enabling a single wrench to be used on the bolt head 58, for rotating the bolt 54 in an amount sufficient to apply the necessary squeezing or clamping force on the pipe section 22.

Referring to FIG. 11, when the nut end portion 64 is within opening 52, and the bolt 54 is tightened, something else happens. The side surfaces of nut portion 64 are moved into contact with the side surfaces of the opening 52. As the bolt head 58 and the nut 62 are drawn together, the shoulder 68 is drawn into tight engagement with the metal surrounding opening 90 (FIG. 12).

The tight fit of nut end portion 64 within the opening 52, and the pressure exerted by the shoulder 68 against the region of saddle arm portion 16 which surrounds the opening 52, serves to stiffen the part of arm portion 16 which extends outwardly from the support leg 24, so that it does not want to bend.

Referring to FIGS. 10 and 11, the rod body 56 makes a relatively loose fit within the opening 50. As a result, the nut and bolt assembly are automatically moved by the turning force on bolt head 58 into a position in which the axis of the bolt 54 extends substantially perpendicular to the surface of arm portion 16 against which shoulder 68 bears. The inner surface of bolt head 58 exerts a force on saddle arm portion 14. This saddle arm portion 14 has a relatively long unsupported portion and as a result it can bend much more freely than the arm portion 16 which is secured to the support leg means 24. Thus, the clamping pressure is applied to the pipe 22 by the lower arm portion 14 bending towards the arm portion 16. The loose fit of bolt body 58 in the opening 50 allows relative movement to occur between the bolt body 56 and the arm portion 14, so that bending is not apt to occur between the rod body 56 and the surfaces of opening 50, in a manner tending to resist deflection of arm portion 14.

The fact that there is no key which has to be rolled over the outer end 82 of arm portion 16 makes it possible to round off the outer end 82, eliminating sharp corners. The outer end 84 of arm portion 14 is also rounded, to eliminate sharp corners. The fact that the engagement of the nut portion 64 within the opening 52, and the pressure of the shoulder 68 against the arm portion 16, resists bending of arm portion 16, and results in protection for the weld 36. It is not likely to tear as it would be if the outstanding part of arm portion 16 were to be bent.

The fact that arm portion 16 does not have to bend makes it possible to extend the whole width of the support leg outer end portion 34 down to the arm portion 16. This results in greater weld area at 36 and stronger connection.

The liner 80, and its arrangement within the saddle 12, are preferably as is described in my aforementioned application Ser. No. 730,285.

Figure 8:
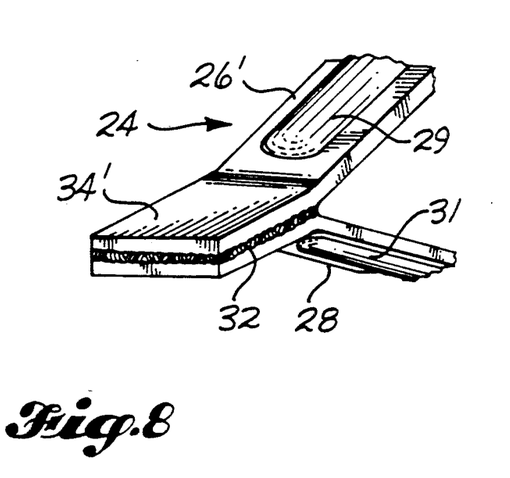
FIG. 8 is a fragmentary pictorial view of the outer end portion of a modified form of support leg member, with the pipe holding saddle removed.
Figure 9:
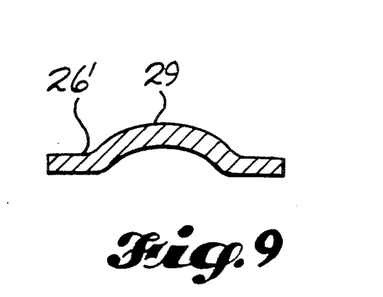
FIG. 9 is a sectional view through one part of the support leg member, showing a strengthening rib that is formed into said part.

FIGS. 8 and 9 show a way of constructing the support leg from thinner material. The parts 26', 28' are formed to include stiffening ribs 29, 30 which extend essentially the full lengths of the parts 26', 28'. The end portions 32', 34' of the members 26', 28' are welded together, at 32, as in the first embodiment. This is probably the preferred way of constructing the support leg 24'.

Shown in FIG. 16 is a prior art embodiment of the invention disclosed in my aforementioned application Ser. No. 730,285. This prior art side-load type pipe hanger with a single bolt closure comprises a generally C-shaped saddle 12 attached to a rigid support leg 82. Closure of this pipe hanger is accomplished in substantially the same way as that described above.

Modifications in the construction of the hanger could be made without departing from the spirit of the invention, as defined by the following claims. The claims are to be interpreted in accordance with the established rules of claim interpretation, including use of the doctrine of equivalents.

What is claimed is:

1. A pipe hanger capable of withstanding substantial shock loads, comprising:

a generally C-shaped saddle comprising a pair of spaced apart inner and outer arm portions and an interconnecting bight portion, together defining a space in which a pipe is received;

a retainer member connectable to the saddle, to extend from one arm portion to the other outwardly of the pipe, for retaining the pipe within the saddle;

a support portion comprising a pair of elongated metal bars each being substantially thinner than it is wide, said bars having outer end and inner ends;

said bars being straight and parallel throughout their full lengths and also being uniform in cross-section throughout their full lengths and at their outer ends being welded together and to the inner arm portion of the saddle, with the welded together portions forming a flex beam section which extends inwardly from the inner arm portion of the saddle, and extends substantially perpendicular to said inner arm portion of the saddle;

said elongated metal bars, in their extent inwardly of the flex beam section, being unattached and being bendable away from each other, whereby the pipe hanger can be delivered to an installer with the two bars together in side-by-side juxtaposition, and then the installer can pull the two bars apart inwardly of the flex beam section, to make each extend at an angle to the other, and then the inner ends of the bars can be welded to a support structure, so that the bars and the support structure will together form a relatively rigid brace triangle for the flex beam section and the saddle;

wherein the two bars are welded together throughout the flex beam section, by continuous weld beads extending along adjoining side boundaries of the bars, on both sides of the flex beam sections;

wherein the two bars are at their outer ends butt welded to the arm of the saddle;

said flex beam section being of sufficient length to in use behave as a flexible cantilever beam and to bend relative to the brace triangle in response to substantial shock loads to, in that manner, absorb substantial shock loads; and said continuous weld beads being integral parts of and bending with said flexible beam section as it in use bends relative to the brace triangle in response to shock loads.

2. A pipe hanger according to claim 1, wherein the retainer member for securing the pipe within the saddle comprises a bolt having a rod body, an enlarged head at a first end of said rod body and a threaded end portion at the second end of said rod body, and a nut including a central opening that is threaded with threads which complement the threads at the second end of the rod body, said nut including a small sized first end portion having a cross sectional shape that is other than circular, and a larger sized second end portion; and wherein the arm portion of the saddle that is not connected to the support leg includes a first opening which is smaller in size than the head of the bolt but is larger in size than the rod body of the bolt, said rod body of the bolt being sized to make a loose fit in said first opening, and wherein the arm portion of the saddle which is connected to the support leg includes a second opening which is substantially larger in size than the rod body of the bolt, so that the rod body also fits loosely in said second opening, is smaller in size than the second end portion of the nut, and is sized and complementary shaped to snugly receive the small size first end portion of the nut, whereby a pipe section can be placed into said C-shaped saddle, and the bolt can be inserted threaded end portion first through the first opening, then through the second opening, and then the nut can be applied to the bolt with its small size first end portion directed towards the second opening, and then the bolt can be rotated by use of a wrench applied to the head of the bolt, for drawing the nut and bolt together to apply a clamping force on the pipe section, with the fit of the small sized first end portion of the nut within the second opening serving to hold the nut against rotation while the bolt is being rotated, and wherein the snug engagement of the small end of the nut within the second opening, backed by the large end of the nut, results in the nut and bolt assembly substantially stiffening the second arm portion as the nut and bolt assembly are drawn together, so that at least most bending will occur within the first arm portion.

3. A pipe hanger assembly, comprising:

a generally C-shaped saddle comprising a pair of spaced apart arm portions and an interconnecting bight portion, together defining a pipe receiving space;

a pipe within said pipe receiving space;

means connectable to the saddle, to extend from one arm portion to the other outwardly of the pipe, for retaining the pipe within the saddle; and a support portion comprising a pair of elongated metal bars each being substantially thinner than it is wide, said bars having outer ends and inner ends;

said bars at their inner ends being straight and uniform in cross-section and at their outer ends being welded together and to the inner arm portion of the saddle, with the welded together portions forming a flex beam section which extends inwardly from the inner arm portion of the saddle, and extends substantially perpendicular to said arm portion of the saddle;

said two bars diverging apart as they extend from said flex beam portion towards and at their inner ends;

a support structure;

the inner ends of the bars being butt welded to the support structure so that the divergent portions of the bars and the support structure will together form a relatively rigid brace triangle;

wherein the two bars are welded together throughout the flex beam section, by continuous weld beads extending along adjoining side boundaries of the bars, on both sides of the flex beam section;

wherein the two bars are at their outer ends butt welded to the arm of the saddle;

said flex beam section being of sufficient length to behave as a flexible cantilever beam and to bend relative to the brace triangle in response to substantial shock load to, in that manner, absorb substantial shock loads; and said continuous weld beads being integral parts of and bending with said flexible beam section as it bends relative to the brace triangle in response to shock loads.

4. A pipe hanger according to claim 3, wherein the means for securing the pipe within the saddle comprises a bolt having a rod body, an enlarged head at a first end of said rod body and a threaded end portion at the second end of said rod body, and a nut including a central opening that is threaded with threads which complement the threads at the second end of the rod body, said nut including a small sized first end portion having a cross sectional shape that is other than circular, and a larger sized second end portion; and wherein a first arm portion of the saddle includes a first opening which is smaller in size than the head of the bolt but is larger in size than the rod body of the bolt, said rod body of the bolt being sized to make a loose fit in said first opening, and wherein the second arm portion of the saddle includes a second opening which is substantially larger in size than the rod body of the bolt, so that the rod body also fits loosely into said second opening, is smaller in size than the second end portion of the nut, and is sized and complimentarily shaped to snugly receive the small sized first end portion of the nut, whereby a pipe section can be placed into said C-shaped saddle, and the bolt can be inserted threaded end portion first through the first opening, then through the second opening, and then the nut can be applied to the bolt with its small sized first end portion directed towards the second opening, and then the bolt can be rotated by use of a wrench applied to the head of the bolt, for drawing the nut and bolt together to apply a clamping force on the pipe section, with the fit of the small sized first end portion of the nut within the second opening serving to hold the nut against rotation while the bolt is being rotated, and wherein the snug engagement of the small end of the nut within the second opening, backed by the large end of the nut, results in the nut and bolt assembly substantially stiffening the second arm portion as the nut and bolt assembly are drawn together, so that at least most bending will occur within the first arm portion.

5. A pipe hanger capable of withstanding substantial shock loads, comprising:

a generally C-shaped saddle comprising a pair of spaced apart inner and outer arm portions and an interconnecting bight portion, together defining a space in which a pipe is received;

a retainer member connectable to the saddle, to extend from one arm portion to the other outwardly of the pipe, for retaining the pipe within the saddle;

a support portion comprising a pair of elongated metal bars each being substantially thinner than it is wide, said bars having outer ends and inner ends;

said bars being straight and parallel throughout their full lengths and at their outer ends being welded together and to the inner arm portion of the saddle, with the welded together portions forming a flex beam section which extends inwardly from the inner arm portion of the saddle, and extends substantially perpendicular to said inner arm portion of the saddle;

said elongated metal bars, in their extent inwardly of the flex beam section, being unattached and being bendable away from each other, whereby the pipe hanger can be delivered to an installer with the two bars together in side-by-side juxtaposition, and then the installer can pull the two bars apart inwardly of the flex beam section, to make each extend at an angle to the other, and then the inner ends of the bars can be welded to a support structure, so that the bars and the support structure will together form a relative rigid brace triangle for the flex beam section and the saddle;

wherein the two bars are welded together throughout the flex beam section, by continuous weld beads extending along adjoining side boundaries of the bars, on both sides of the flex beam section;

wherein the two bars are at their outer ends butt welded to the arm of the saddle;

said flex beam section being of sufficient length to in use behave as a flexible cantilever beam and to bend relative to the brace triangle in response to substantial shock loads to, in that manner, absorb substantial shock loads;

said continuous weld beads being integral parts of and bending with said flexible beam section as it bends relative to the brace triangle in response to shock loads; and said elongated metal bars including strengthening ribs extending essentially the full length of the unattached portions of the bars, each said strengthening rib being a deformed portion of the bar presenting a convex surface on one side of the bar and a concave surface on the other side.

* * * * *

UNITED STATES PATENT AND TRADEMARK OFFICE
CERTIFICATE OF CORRECTION

PATENT NO. : 5,092,547
DATED : March 3, 1992
INVENTOR(S) : Peter S. Richards

It is certified that error appears in the above-identified patent and that said Letters Patent is hereby corrected as shown below:

Title Page:
In the Abstract, 6th line from the bottom, "Thus" should be
    -- This --.
Column 2, line 20, "2,936,992" should be -- 2,936,991 --.
Claim 1, column 9, line 12, "end" should be -- ends --.

Signed and Sealed this

Sixth Day of July, 1993

Attest:

MICHAEL K. KIRK

Attesting Officer   Acting Commissioner of Patents and Trademarks